No. 763,629. PATENTED JUNE 28, 1904.
D. T. PHILLIPS.
CORN HARVESTING, BINDING, AND SHOCKING MACHINE.
APPLICATION FILED JAN. 6, 1904.
NO MODEL. 5 SHEETS—SHEET 1.
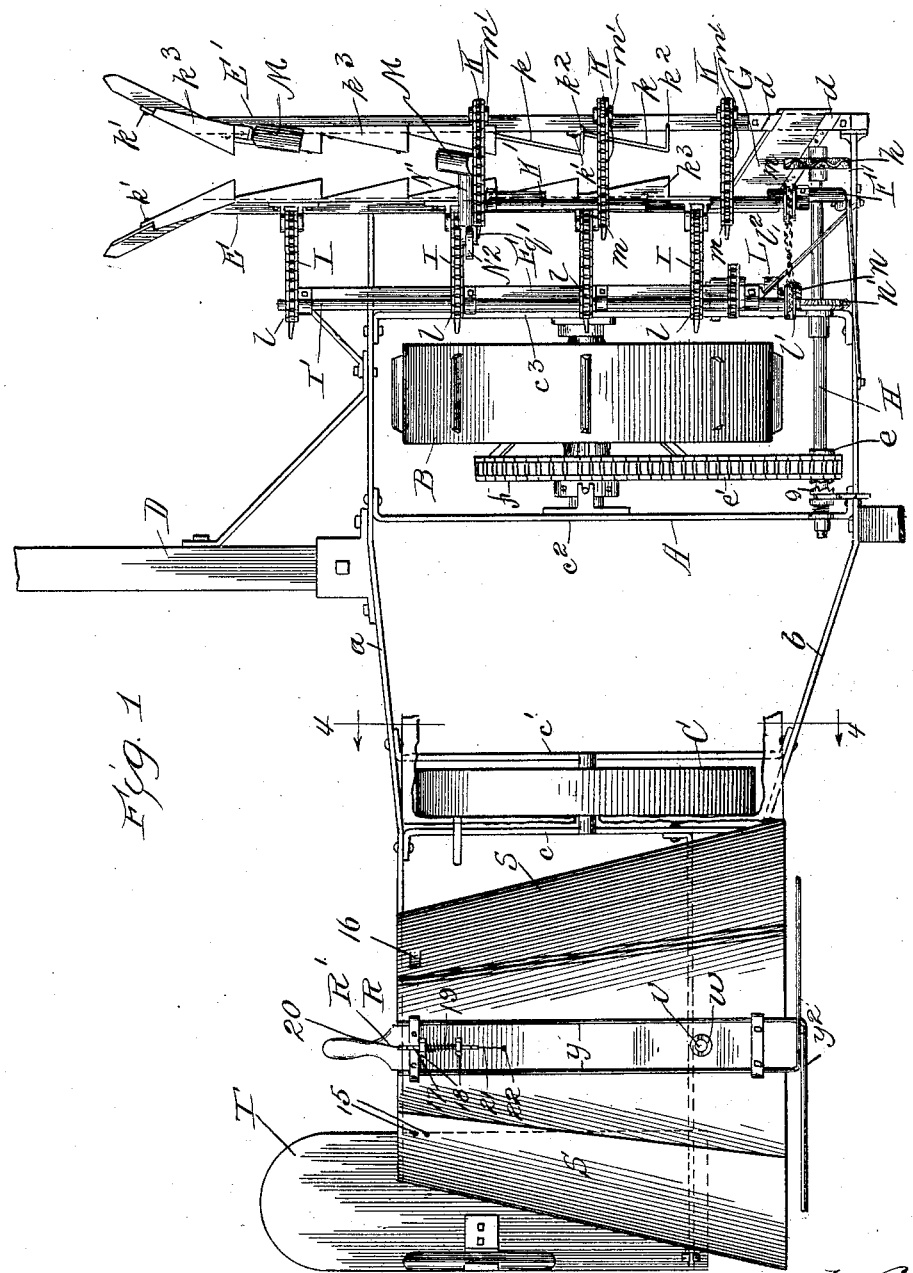

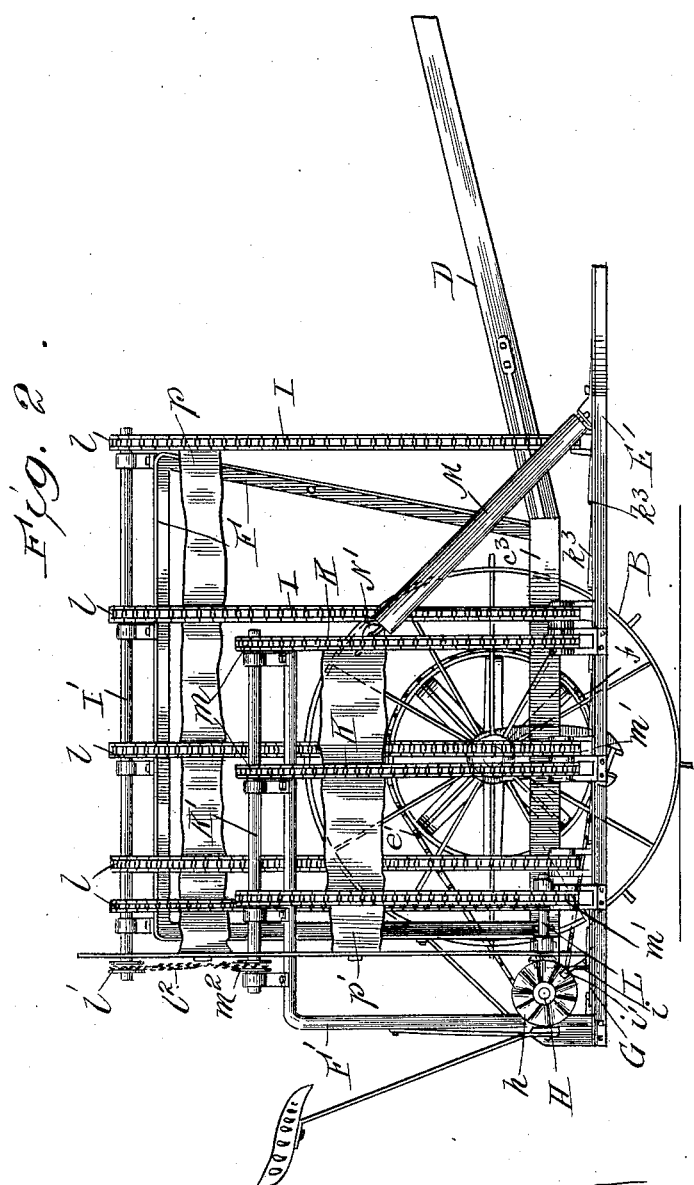

No. 763,629. PATENTED JUNE 28, 1904.
D. T. PHILLIPS.
CORN HARVESTING, BINDING, AND SHOCKING MACHINE.
APPLICATION FILED JAN. 6, 1904.
NO MODEL. 5 SHEETS—SHEET 3.
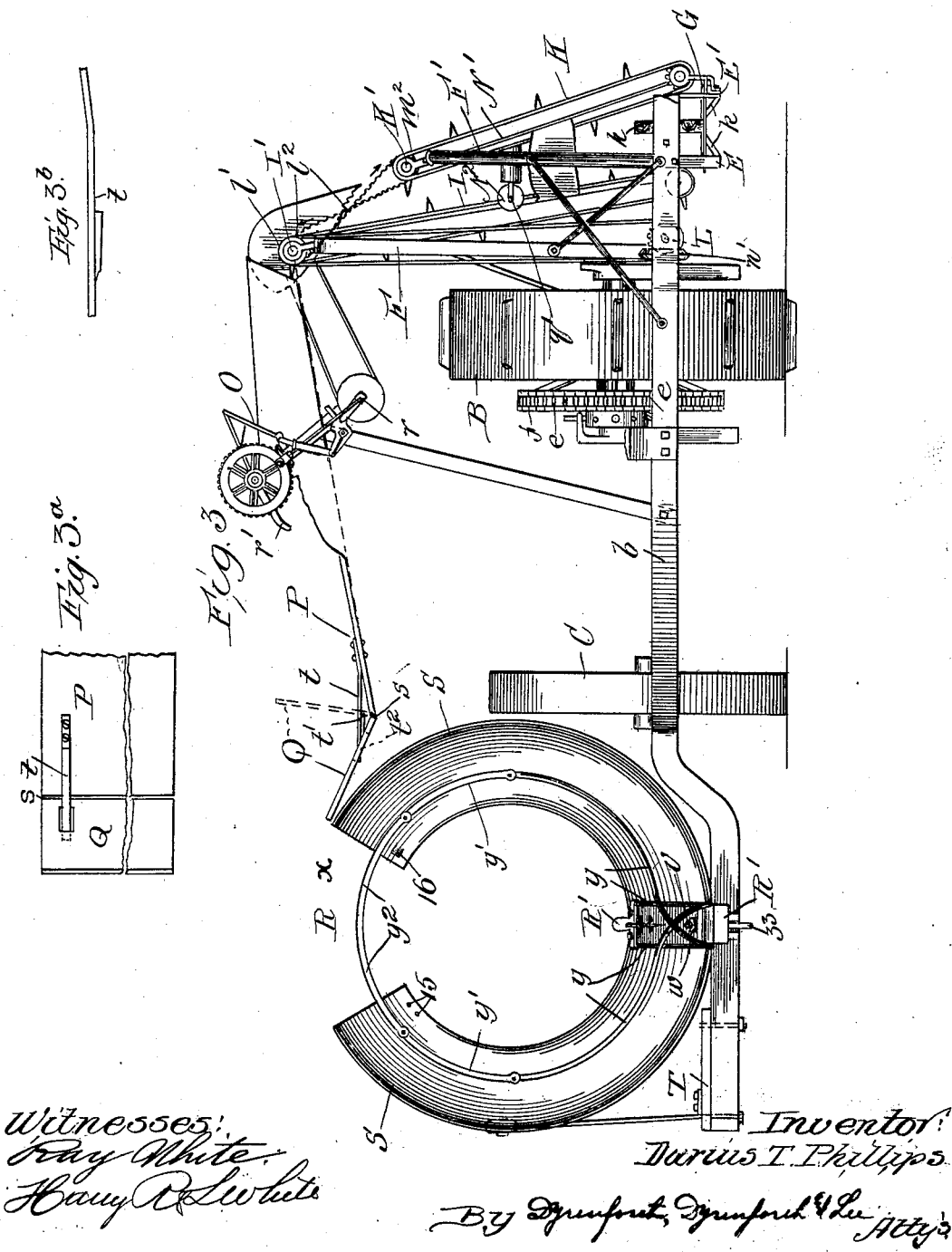
Witnesses:
Ray White
Harry R. White
Inventor:
Darius T. Phillips
By Dyrenforth, Dyrenforth & Lee
Atty's

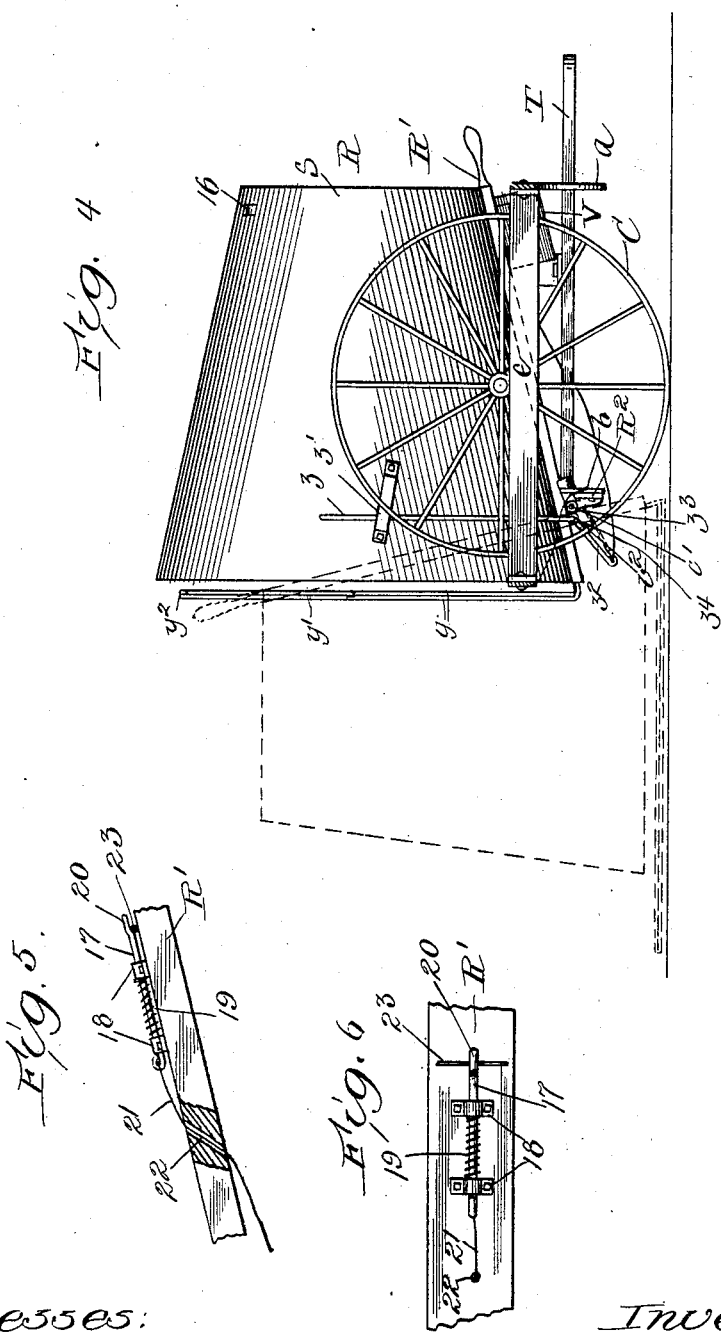

No. 763,629. PATENTED JUNE 28, 1904.
D. T. PHILLIPS.
CORN HARVESTING, BINDING, AND SHOCKING MACHINE.
APPLICATION FILED JAN. 6, 1904.
NO MODEL. 5 SHEETS—SHEET 5.

Witnesses:
Harry R. White
Ray White

Inventor:
Darius T. Phillips
By Dyrenforth, Dyrenforth & Lee Attys.

No. 763,629. Patented June 28, 1904.

UNITED STATES PATENT OFFICE.

DARIUS T. PHILLIPS, OF CHICAGO, ILLINOIS, ASSIGNOR OF ONE-HALF TO FRANK C. STEVENS, OF CHICAGO, ILLINOIS.

CORN HARVESTING, BINDING, AND SHOCKING MACHINE.

SPECIFICATION forming part of Letters Patent No. 763,629, dated June 28, 1904.

Application filed January 6, 1904. Serial No. 187,946. (No model.)

*To all whom it may concern:*

Be it known that I, DARIUS T. PHILLIPS, a citizen of the United States, residing at Chicago, in the county of Cook and State of Illinois, have invented a new and useful Improvement in Corn Harvesting, Binding, and Shocking Machines, of which the following is a specification.

My object is to provide a machine of generally-improved construction which will operate to harvest cornstalks, bind them into bundles, form the bundles into shocks, and discharge and deposit the shocks in standing position along the path of the machine.

It is also my object to provide certain improvements in details of construction of various of the mechanisms with a view to the production of a machine which will perform each of the functions stated in a manner eminently satisfactory and be of a construction which will render the machine as a whole particularly strong, durable, and compact and well adapted for use in the field.

Figure 7:
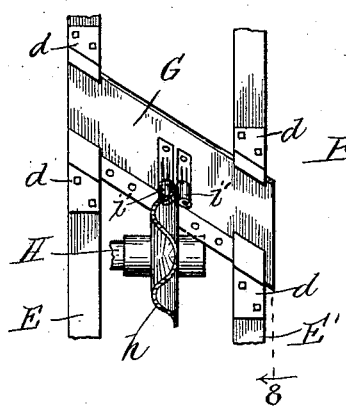
Figure 8:
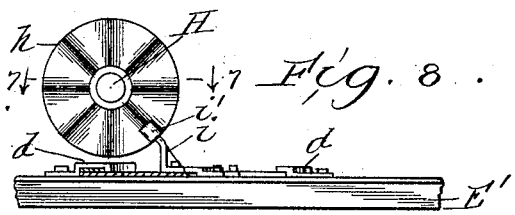
Figure 9:
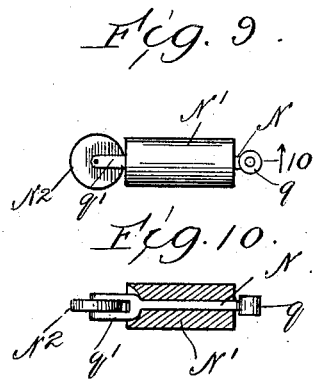
Figure 10:
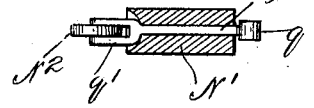
Figures 11, 12:
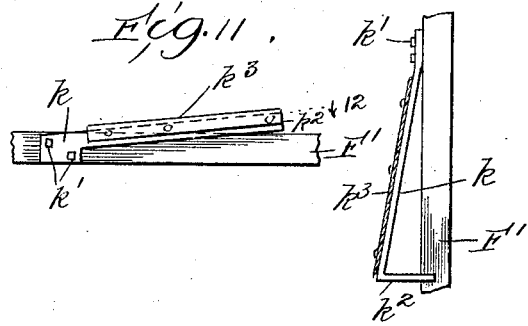
Figure 13:
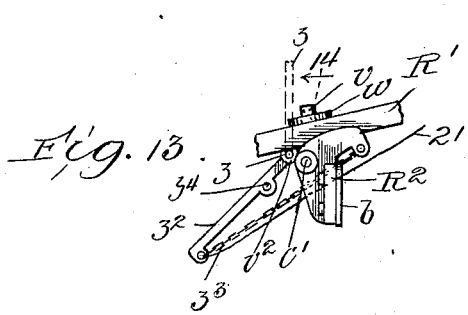
Figure 14:
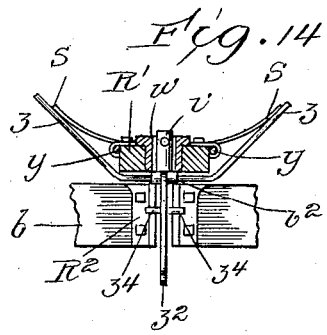

In the drawings, Figure 1 is a top plan view of the machine with parts broken away for the purpose of exposing details which would otherwise be hidden and with the cornstalk-binder mechanism left out; Fig. 2, a side elevation with parts broken away; Fig. 3, a partly-broken rear-end elevation showing the binder in place in the machine; Fig. $3^a$, a broken plan view of the binder-deck and a hinged extension thereof; Fig. $3^b$, a detached and enlarged view, in side elevation, of a spring-catch for holding the binder-deck extension when raised; Fig. 4, a sectional view taken on line 4 in Fig. 1, showing the shocker mechanism in side elevation, its receiving position being shown by full lines and its discharging position by dotted lines; Fig. 5, an enlarged, broken, and partly-sectional side view of one of the details of the shocker mechanism; Fig. 6, a plan view of the same detail; Fig. 7, an enlarged broken plan section of the cornstalk-cutter and its reciprocator, the section being taken on line 7 in Fig. 8; Fig. 8, a section on line 8 in Fig. 7; Fig. 9, an enlarged detail view of a pivotally-mounted cornstalk-upsetting-roller device forming part of the harvester mechanism; Fig. 10, a section on line 10 in Fig. 9; Fig. 11, an enlarged broken side view of a portion of the outer stalk-guiding bar and one of the yielding weed-upsetting and stalk-positioning springs which I employ; Fig. 12, a broken plan section taken on line 12 in Fig. 11; Fig. 13, an enlarged broken view of details forming part of the shocker construction, and Fig. 14 a section taken on line 14 in Fig. 13.

A is the skeleton frame of the machine, formed with the forward bar $a$, rear bar $b$, shaped as indicated in Figs. 1 and 3, and longitudinally-extending cross-bars $c\ c'\ c^2\ c^3$, as well as additional braces which will be referred to later in the description where necessary. Journaled in bearings on the bars or braces $c^2\ c^3$ is the axle of a master-wheel B, and a supporting-wheel C is journaled at its shaft in the bars or braces $c\ c'$. The wheels B C form the supports of the machine, and a braced tongue D, extending from the bar $a$, forms means for the connection of draft-animals, whereby the machine may be drawn and maintained in upright position.

E E' are inner and outer stalk-guiding bars, formed with flaring ends, as shown. The bar E is fastened by suitable brackets to the bar $c^3$, and the main frame carries a harvester-frame F, of which the outer bar E' forms a part.

Mounted in guide-clips $d$ on the bars E E' is an inclined horizontal knife G, which may reciprocate longitudinally in the guides $d$.

H is a shaft carrying a loose sleeve $e$, provided with a sprocket-wheel geared by a chain $e'$ to a sprocket drive-wheel $f$ on the axle of the wheel B. On the shaft H is a sliding clutch mechanism $g$, whereby it may be thrown into or out of driving engagement. On the shaft is a wheel or disk $h$, shaped to form a plurality of radially-extending cams, and on the knife G are brackets $i$, carrying companion rollers $i'$, embracing the cam-disk, whereby in the rotation of the latter the knife is reciprocated in the guides $d$.

On each of the bars E E' is a series of springs $k$, attached to the bar at $k'$ and extending at their free ends $k^2$ over the tops of the bars. On each spring is a shield-plate $k^3$, which moves with the spring and operates as a guard to prevent clogging thereof.

F' is a frame forming a part of the harvester-frame F.

I is an inner inclined elevator, and K an outer inclined elevator. The elevator I is on the frame F and has a shaft I' journaled in brackets on the upper end of said frame. The shaft I' carries five sprocket-wheels $l$ in the relative position shown. Running over the sprocket-wheels $l$ are elevator-chains, which at their lower ends run over sprocket-wheels journaled in brackets on the bar E. The sprocket-chains mentioned form the elevator I.

Journaled in brackets on the top of the frame F' is a shaft $k'$, carrying three sprocket-wheels $m$ in the position shown, over which sprocket-chains run, and journaled in brackets on the bar E' are also sprocket-wheels $m'$ for the said chains to run upon, the construction forming the elevator K. A short shaft L, journaled in brackets on the bar E, carries a beveled gear $n$, meshing with a beveled gear $n'$ on the shaft H, the said shaft L carrying one of the lower sprocket-wheels of the elevator I. The shafts I' K' carry sprocket-wheels $l'$ $m^2$, respectively, connected by a drive-chain $l^2$, whereby in the rotation of the shaft H the shaft L is driven and through the first elevator-chain drives the shaft I', which in turn drives the shaft K'. Thus both elevators are geared to move in the upward direction on their inner sides.

The frames F F' are provided with, preferably, sheet-iron facings $p$ $p'$, respectively, between the lengths of the respective elevator-chains and forming smooth walls along which the elevator-chains move at their inner sides.

M is a stalk guiding and deflecting roller, loosely journaled at its lower end on the bar E' and journaled at its upper end in the frame of the elevator K. The roller extends in a backward-inclined direction, as shown in Fig. 2, and laterally inward, as shown in Fig. 1. At the upper end of the roller M is a cross-extending shaft N, (see Figs. 9 and 10,) formed at one end with an eye $q$ and having a bifurcated part $q'$. The shaft is pivotally mounted at the eye $q$ upon the frame of the elevator K, as indicated in Fig. 3, to swing on its pivot in the vertical plane. Journaled on the shaft N between the ends $q$ $q'$ is a roller N', and journaled in the bifurcated part $q'$ is a roller or wheel $N^2$.

In the operation of the harvester mechanism described the machine is guided so that a row of standing corn will enter between the guides E E'. The flaring points of the guides will tend to pick up down corn in the usual way, while the springs $k$ will operate to turn down weeds or the like to prevent their standing in the path of the cutter G. The springs $k$ yield laterally in the event of their striking cornstalks, but are sufficiently stiff to prevent their yielding by engagement with weeds or the like. On entering between the guides E E' the cornstalks are deflected by the roller M and bent inward toward the inner elevator I. As the stalks are reached by the roller N' they are stopped thereby and bent in the forward direction. This bending continues until the stalk is engaged and severed near its base by the reciprocating knife G. When severed, the stalks are engaged by the elevator and carried upward. The raising of the stalks is performed substantially altogether by the inner elevator I, the outer elevator operating as a guard to prevent the stalks falling from the machine. As the stalks are raised by the elevator beneath the roller N' the latter is swung upward on its pivot, permitting the stalks to pass readily between the roller $N^2$ and elevator guard-plate $p$. Thus the stalks are cut and turned forward with their butt-ends toward the rear end of the machine, and in this substantially horizontal position they are raised by the elevator and discharged laterally in a common manner.

On the opposite side of the wheel B from the harvesting mechanism described I provide a binder O, of which $r$, Fig. 3, is the packer-shaft and P the binder-deck. By reason of the fact that any suitable form of corn-binder, of which there are a number well-known in the art, will answer my purpose I have not thought it necessary or desirable to encumber the drawings with details of the construction. The function of the binder is to receive the cornstalks discharged from the elevator I, assemble and bind them into bundles, and then discharge them by means of the discharging-arms $r'$ laterally onto the deck P. While in machines as ordinarily constructed the bundle when formed and deposited upon the binder-deck slides therefrom, for my purpose I find it desirable to prevent the bundles from sliding from the deck. I provide the deck P with a hinged extension or leaf Q of the full length of the deck and connected therewith pivotally at the adjacent edges $s$. On the deck P is a spring-catch $t$, having a shoulder $t'$ and extending through an opening $t^2$ in the extension Q. The hinged connection is such that the leaf or extension Q may drop to the position shown by full lines in Fig. 3 or be raised to the position indicated by dotted lines in that figure and held in the latter position by the shoulder $t'$ of the spring-catch.

R is a shocker of the general form shown, described, and claimed in a separate concurrent application filed in the United States Patent Office on the 6th day of January, 1904, and bearing Serial No. 187,949. At the base of the shocker is a longitudinally-extending bar R', formed at one end into a handle and pivotally mounted toward its rear end upon a bracket R², fastened to the bar b. A pin v on a shaft v', journaled in the bracket, passes loosely through an enlarged bearing w in the bar R', producing a hinge connection on which the bar can rock slightly from side to side by reason of the fact that the bearing-opening is of materially greater diameter than the pin v, besides being turned from the position shown by full lines in Fig. 4 to that shown by dotted lines. Hinged to opposite edges of the bar R' are the sections or members S S of a shock-forming receptacle. This receptacle is shaped somewhat like the frustum of a cone, with a longitudinally-extending slot or opening x between the members. At the hinge connections between the members S and bar R' are longitudinally-extending rods y, rigid with relation to the adjacent edges of the members to turn with them on the hinge connections. The rods y at the rear end of the bar R' cross each other and extend when the receptacle is in its stalk-receiving position, as shown in Fig. 3. Each of the rods is bent to form the segment of a circle, and each has hinge-sections $y'$ $y^2$, the sections $y^2$ overlapping each other loosely. A rod z extends across the under side of the bar R' and up the sides of the sections S loosely through guides $z'$ on the sections. Between its ends the rod is pivotally mounted in an ear $v^2$ of the bracket and there carries a downward-extending arm $z^2$, connected by a chain $z^3$ with the bracket.

As the bundles of cornstalks are delivered upon the deck P they slide laterally to the upward-inclined extension Q. An operator stands on a platform T, fastened upon the bars a b, and as the bundles are delivered onto the deck extension Q rolls or drags them over and deposits them in the opening x, whence they fall into the receptacle. The rods y, with their hinged members, extend normally as shown in Fig. 3 and are near the rear end of the receptacle, thus operating as spreaders to shape the accumulating bundles into a shock. Beneath the forward part of the bar R' and fastened thereto is a twine-box V, from which a length of twine extends upward and is strung through perforations 15 on one member S, whence it is looped, being held at its free end in a catch 16 on the other member S. Near the forward end of the bar R' is a longitudinally-extending rod 17, longitudinally movable in guides 18 on the bar and held normally in the forward position shown in Figs. 1, 5, and 6 by a spring 19. The forward end of the rod 17 is bent to form a catch 20, and fastened to the rear end of the rod is a cord 21, passing through an opening 22 in the bar and fastened at its opposite end to the arm $z^2$. The twine 23 mentioned is looped from the tensioning-openings 15 to the catch 16 and passed under the catch 20 of the rod 17. When the shock-forming receptacle R has been filled by the operator, he raises the deck extension Q to the position shown by dotted lines in Fig. 3, in which position it is held by the shoulder of the spring t. The extension thus produces a guard against which bundles may be piled as discharged from the binder without rolling from the deck. The operator disengages the end of the twine from the catch 16 and ties the shock, severing the twine adjacent to the tensioning-openings 15. The operator then grasps the handle end of the bar R' and raises it, swinging the receptacle from the position shown in Fig. 4 by full lines to the position there shown in dotted lines. When the receptacle nears the latter or upright position, a pin $z^4$ on the arm $z^2$ contacts with the bracket R², thereby swinging the rod z from the position shown in Fig. 4 to the opposite ends of the guides $z'$. The guides $z'$ are parallel with the adjacent surfaces of the members S, and the rod z in its movement swings the members outward on their hinges to open them far enough to permit discharge of the shock. This swinging of the members S away from each other causes the rods y beyond where they cross to swing in the direction of each other and cause the pivotal sections $y'$ $y^2$ to swing on their hinges and extend in approximately parallel lines to permit their ready withdrawal from the shock. The shock is discharged while the machine is moving in the forward direction. The engagement of the catch 20 with the twine which binds the shock prevents the shock in the sudden turning of the receptacle from being thrown at its upper end in the backward direction with sufficient force to upset it. As the receptacle nears the upright position it pulls upon the cord 21, causing the latch 20 to release the twine. As explained in my aforesaid pending application, the shock is released by the members S and spreader-rods y when the butt-end of the shock is about eight inches from the ground. Thus as the cord 21 withdraws the catch 20 the shock drops upon the ground and remains steady while the spreader-rods are being withdrawn. The loose connection of the receptacle at the pin v permits the latter to rock slightly, and thus facilitate its freeing itself from the shock while the machine may be moving across uneven ground.

The construction of the arm-sections $y'$ $y^2$ is shown in detail in my aforesaid pending application, Serial No. 187,949. It is thought sufficient in the present connection to state that the hinge connections between the parts y $y'$ and parts $y'$ $y^2$ are such that the sections will drop by gravity to the position shown in Fig. 3 when the shocker is turned to the horizontal position shown.

In my improved machine the tongue or draft connection D is at about the center between ends of the main frame, the guiding and elevating means are on the outer side of the master-wheel, the binding mechanism is above and at the inner side of the master-wheel, and the shock mechanism on the outer side of the supporting-wheel C. Thus the machine is well balanced and is particularly free from danger of tipping over on any side hills where harvesting-machines may be operated. The shock-forming receptacle as it is raised to the discharging position may be swung laterally a limited distance, turning on the pin $v$, whereby the shock may be discharged more or less to one side of the path of the machine, if desired, to position it out of the way of the said path when the machine operates upon the next adjacent row of standing corn.

The springs $k$ on the guides E E' have sufficient resistance to bear or break down weeds and the like in the path of the cutter-knife, thereby preventing them from being engaged by the knife. The springs will yield as they contact with standing stalks, and in the case of down corn they will tend to slide under the same and hold the stalks in position above the ground, whereby the elevators can take hold and raise them. It rarely happens that a stalk would be broken below the plane of the springs $k$, so that practically all down corn would be raised by the guides and springs and engaged by the elevators.

While I prefer to construct my improvements throughout as shown and described, they may be variously modified in the matter of details without departing from the spirit of my invention as defined by the claims.

What I claim as new, and desire to secure by Letters Patent, is—

1. In a corn-harvester, the combination of a main frame, a large master-wheel and smaller supporting-wheel on which the frame is mounted, standing-stalk engaging and deflecting means at the outer side of the master-wheel, for engaging the standing stalks and bending them in the forward direction, a cutter in rear of said deflecting means, inner and outer elevating means for the cornstalks in front of said cutter, a binder partly above and at the inner side of said master-wheel into which the said elevator discharges, a bundle carrying and accumulating binder-deck on which the bound bundles are deposited by the binder, a pivotally-mounted shock-forming receptacle on the main frame at the outer side of said supporting-wheel, and means for turning the said receptacle on its pivot to discharge the shock, substantially as and for the purpose set forth.

2. In a corn-harvester, the combination with the main frame and master-wheel, of a pair of longitudinally-extending standing-stalk-receiving guides at one side of the master-wheel, horizontally and inwardly extending backwardly-inclined yielding weed-depressing and down-corn-supporting springs on each said guide, shield-plates on said springs sliding over said guides, a cutter-knife at the rear end portion of said guides, means for deflecting the standing corn, and elevating and discharging means for the cut stalks, all arranged to operate substantially as and for the purpose set forth.

3. In a corn-harvester, the combination with the main frame, of a pair of longitudinally-extending inner and outer standing-stalk-receiving guides, coöperating inwardly-inclined elevators extending upwardly respectively from said guides, a cutter-knife at the rear end portion of said guides, an upwardly-extending backwardly and inwardly inclined stalk-deflecting roller in front of said outer elevator, and a cross-extending upwardly-yielding roller hinged at one end to the outer elevator-frame at the upper end of said deflecting-roller, and extending toward the inner elevator, substantially as and for the purpose set forth.

4. In a corn-harvester, the combination with the main frame, of a pair of longitudinally-extending inner and outer standing-stalk-receiving guides, coöperating inwardly-inclined elevators extending upward respectively from said guides, a cutter-knife at the rear end portion of said guides, an upwardly-extending backwardly and inwardly inclined stalk-deflecting roller in front of said outer elevator, a cross-extending upwardly-yielding shaft hinged to the outer elevator-frame at the upper end of said deflecting-roller and extending toward the inner elevator, a roller extending longitudinally of and journaled upon said shaft, and an upright wheel journaled in the end of said shaft, all constructed and arranged to operate substantially as and for the purpose set forth.

5. In a corn-harvester, the combination with the main frame and stalk guiding, upsetting and elevating means on said frame, of a stalk-binder having a bundle carrying and accumulating binder-deck on which it deposits the bundles, a pivotally-mounted shock forming and discharging receptacle beyond said deck, a hinged deck extension extending normally into the path of said receptacle and catch mechanism for holding said deck extension in raised position out of the path of said receptacle during the shock-discharging operation comprising a spring $t$ on the deck, having a shoulder $t'$ and passing through a guide-opening in the deck extension, substantially as set forth.

6. In a corn-harvester, the combination with the main frame and stalk guiding, upsetting, elevating and binding means thereon, of a pivotally-mounted shock-forming receptacle on the main frame beyond the discharge side of said binder, means for turning the said receptacle on its pivot between horizontal stalk-receiving and vertical stalk-discharging positions, a twine-box on the forward end of said receptacle, twine holding and positioning guides at the upper side of said receptacle, and a twine-holding-catch device at the lower side of said receptacle with operating means therefor to release the twine, all constructed and arranged to operate substantially as and for the purpose set forth.

DARIUS T. PHILLIPS.

In presence of—
J. W. DYRENFORTH,
WALTER N. WINBERG.